US011032270B1

(12) United States Patent
Tsarfati et al.

(10) Patent No.: US 11,032,270 B1
(45) Date of Patent: Jun. 8, 2021

(54) SECURE PROVISIONING AND VALIDATION OF ACCESS TOKENS IN NETWORK ENVIRONMENTS

(71) Applicant: CyberArk Software Ltd., Petach-Tikva (IL)

(72) Inventors: Omer Tsarfati, Petach-Tikva (IL); Asaf Hecht, Tel Aviv (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/841,803

(22) Filed: Apr. 7, 2020

(51) Int. Cl.
*G06F 17/00* (2019.01)
*H04L 29/06* (2006.01)

(52) U.S. Cl.
CPC ........ *H04L 63/083* (2013.01); *H04L 63/0281* (2013.01); *H04L 63/0823* (2013.01); *H04L 63/101* (2013.01); *H04L 63/20* (2013.01)

(58) Field of Classification Search
CPC ... H04L 63/0823; H04L 63/20; H04L 63/101; H04L 9/3226; H04L 9/3228; H04L 63/0281; H04L 63/0807; H04L 63/083–63/0846; H04L 9/3213; H04L 63/10; H04L 67/02; G11B 20/00811
See application file for complete search history.

(56) References Cited

U.S. PATENT DOCUMENTS

| 6,360,254 | B1* | 3/2002 | Linden | G06F 21/31 |
| | | | | 709/219 |
| 8,447,829 | B1 | 5/2013 | Geller et al. | |
| 10,218,574 | B1 | 2/2019 | Knudsen et al. | |
| 2003/0065777 | A1* | 4/2003 | Mattila | G06F 21/335 |
| | | | | 709/225 |
| 2004/0221045 | A1* | 11/2004 | Joosten | G06F 21/33 |
| | | | | 709/227 |
| 2004/0260821 | A1* | 12/2004 | Yamamoto | H04L 63/0281 |
| | | | | 709/229 |

(Continued)

FOREIGN PATENT DOCUMENTS

WO  WO 2015/009247 A1  1/2015

OTHER PUBLICATIONS

Communication and Search Report, issued from the European Patent Office in corresponding Application No. 20176680.5-1213 / 3687139, dated Sep. 25, 2020 (6 pages).

(Continued)

*Primary Examiner* — Trong H Nguyen
(74) *Attorney, Agent, or Firm* — Finnegan, Henderson, Farabow, Garrett & Dunner, LLP

(57) ABSTRACT

Disclosed embodiments relate to systems and methods for securely validating access tokens. Techniques include receiving, at a token validation resource, a token provided from a network application, the token having an associated destination network address; wherein the token was dynamically created, and the token was provided to the network application; performing a validation process for the token, the validation process being based on at least the destination network address associated with the token; and determining, based on an outcome of the validation process, whether to permit the network application to assert the token to a destination network resource associated with the destination network address.

20 Claims, 16 Drawing Sheets

(56) References Cited

U.S. PATENT DOCUMENTS

| | | | | |
|---|---|---|---|---|
| 2006/0021019 | A1* | 1/2006 | Hinton | G06F 21/41 726/10 |
| 2008/0289025 | A1* | 11/2008 | Schneider | H04L 63/123 726/10 |
| 2010/0192211 | A1* | 7/2010 | Bono | G06F 21/6209 726/7 |
| 2013/0019308 | A1* | 1/2013 | Meliksetian | H04L 67/02 726/22 |
| 2013/0086645 | A1 | 4/2013 | Srinivasan et al. | |
| 2014/0282919 | A1* | 9/2014 | Mason | H04L 67/02 726/4 |
| 2015/0089569 | A1* | 3/2015 | Sondhi | H04L 63/205 726/1 |
| 2015/0286834 | A1* | 10/2015 | Ohtani | G06F 21/6209 726/28 |
| 2015/0341330 | A1* | 11/2015 | Field-Eliot | G06F 21/335 726/4 |
| 2017/0093918 | A1 | 3/2017 | Banerjee et al. | |
| 2017/0142108 | A1 | 5/2017 | Zhang et al. | |
| 2017/0257360 | A1* | 9/2017 | Gattu | G06F 21/31 |
| 2018/0063140 | A1 | 3/2018 | D et al. | |
| 2018/0131685 | A1* | 5/2018 | Sridhar | H04L 9/3247 |
| 2018/0145986 | A1 | 5/2018 | Chien et al. | |
| 2018/0278624 | A1 | 9/2018 | Kuperman et al. | |
| 2018/0375891 | A1 | 12/2018 | Juncker et al. | |
| 2019/0103968 | A1 | 4/2019 | Srinivasan et al. | |
| 2019/0188377 | A1 | 6/2019 | Niemela et al. | |

OTHER PUBLICATIONS oauth.com, "Redirect URL Validation," Aug. 17, 2016, URL: https://www.oauth.com/oauth2-servers/redirect-uris/redirect-uri-validation/ (retrieved on Sep. 16, 2020).

Abeer Aljarrah et al, "The Demon is in the Configuration," Availability, Reliability, and Security; Aug. 29, 2017, pp. 1-10; Association for Computing Machinery; Reggio Calabri, Italy.

Communication and Search Report, issued from the European Patent Office in corresponding Application No. 20176681.3-1213 / 3687140, dated Oct. 2, 2020 (8 pages).

* cited by examiner

SECURE PROVISIONING AND VALIDATION OF ACCESS TOKENS IN NETWORK ENVIRONMENTS

BACKGROUND

Many modern computing systems implement security protocols for controlling access by users or applications to target resources (e.g., websites, applications, databases, etc.). For example, OAuth is an open authorization protocol defining how users can grant websites or applications access to their data (e.g., sensitive or private user data) without requiring repeated entry of the users' passwords or other authentication credentials. OAuth works in a delegated manner, where a user seeks access to a target website and is redirected to a trusted authorization server that provides the user with an access token that the user can then assert to the target website. The user may have their personal or otherwise sensitive data stored at the website, and access to such data may require an access token from the trusted authorization server.

Many popular Internet resources use OAuth for controlling user access to sensitive or private data, such as Facebook™, Google™, Microsoft™, Dell™, and numerous others. Further, many modern companies use other authorization protocols (e.g., XACML, etc.) or authentication protocols (OpenID, etc.) to manage access to secure data. Through these techniques, companies try to strike a balance between security (e.g., denying access by unauthorized users) and user-friendliness (e.g., not requiring repeated entry of passwords).

Despite the modest security and usability enhancements that OAuth and other protocols offer, they also result in significant security vulnerabilities. These protocols are vulnerable to token leakage, lack of monitoring of the token creation process, privilege escalation threats, taking over trusted entities through redirect URIs, and insufficient limitations on obtaining tokens for sensitive resources. For example, during a normal OAuth process flow, a user's OAuth access token will be passed to an application at a particular URL (e.g., a target website to which the user seeks access). If an attacker is able to take control over the target website and generate a fictitious URL, however, the attacker may thereby receive access tokens sent to the fictitious URL. Because this URL is often whitelisted for the user's browser, it is implicitly trusted. The attacker then has the access tokens, which it may use to impersonate the user to the real target website and thereby obtain access to the user's sensitive data stored at the target website. Thus, in this manner the usability that OAuth offers (e.g., not requiring a user to repeatedly enter their password) works against its goal of security, and leaves an attack vector open to malicious entities.

The use of whitelisted URLs in OAuth systems is also a security vulnerability. If an attacker is able to replace a legitimate URL (e.g., to a legitimate target website) with a fake URL (e.g., to a site controlled by the attacker) in the client's browser, the attacker may receive not only access tokens, but also potentially other sensitive user data (e.g., data in cookies, session data, etc.).

In view of these inefficiencies and security vulnerabilities associated with authorization and authentication protocols for controlling access to sensitive data, there are technological needs for solutions that maintain usability and user-friendliness while also achieving enhanced security. According to the embodiments described below, enhanced techniques may involve a validator resource (e.g., proxy or server) that functions to validate target resource URLs, thereby distinguishing legitimate target URLs from fake or incorrect URLs that attackers may attempt to utilize. Further, in some embodiments the validator server may also validate access tokens before they are asserted to the target resource. According to additional techniques described below, a security server may operate to proactively scan a computing resource (e.g., client computer) and validate any network address information that is stored. Thus, through such a scan valid URLs may be differentiated from illegitimate or malicious URLs, and appropriate security controls may be implemented.

SUMMARY

The disclosed embodiments describe non-transitory computer readable media, systems, and methods for securely validating access tokens. For example, in an exemplary embodiment, there may be a non-transitory computer readable medium including instructions that, when executed by at least one processor, cause the at least one processor to perform operations for securely validating access tokens. The operations may comprise receiving, at a token validation resource, a token provided from a network application, the token having an associated destination network address; wherein the token was dynamically created, and the token was provided to the network application; performing a validation process for the token, the validation process being based on at least the destination network address associated with the token; and determining, based on an outcome of the validation process, whether to permit the network application to assert the token to a destination network resource associated with the destination network address.

According to a disclosed embodiment, the network application was redirected to a network address associated with the token validation resource, and the network address associated with the token validation resource is included on a whitelist maintained by an authorization server.

According to a disclosed embodiment, the validation process includes applying one or more network security policies.

According to a disclosed embodiment, the validation process includes verifying at least one of: a certificate associated with the destination network resource, a range of permitted DNS addresses, or DNS history associated with the destination network resource.

According to a disclosed embodiment, the validation process includes checking permissions associated with the network application.

According to another disclosed embodiment, a method may be implemented for securely validating access tokens. The method may comprise receiving, at a token validation resource, a token provided from a network application, the token having an associated destination network address; wherein the token was dynamically created, and the token was provided to the network application; performing a validation process for the token, the validation process being based on at least the destination network address associated with the token; and determining, based on an outcome of the validation process, whether to permit the network application to assert the token to a destination network resource associated with the destination network address.

According to a disclosed embodiment, an authorization server dynamically created the token in response to the network application sending a request for access to the destination network resource.

According to a disclosed embodiment, the destination network resource redirected the network application to the authorization server based on the request.

According to a disclosed embodiment, an authorization server authenticated an identity associated with the network application before dynamically creating the token.

According to a disclosed embodiment, the authorization server and the destination network resource operate according to an OAuth authorization protocol.

According to a disclosed embodiment, the method further comprises generating a report if the validation process for the token results in the token not being validated.

According to a disclosed embodiment, the method further comprises generating an alert if the validation process for the token results in the token not being validated.

The disclosed embodiments describe non-transitory computer readable media, systems, and methods for securely validating access tokens. For example, in an exemplary embodiment, there may be a non-transitory computer eadable medium including instructions that, when executed by at least one processor, cause the at least one processor to perform operations for receiving, at a proxy resource, a request from a network application for a token; receiving the token; performing a validation process for the token, the validation process being based on at least a destination network address associated with the token; and determining, based on an outcome of the validation process, whether to permit the network application to assert the token to a destination network resource associated with the destination network address.

According to a disclosed embodiment, the proxy resource received the token from an authorization server.

According to a disclosed embodiment, the proxy resource created the token.

According to a disclosed embodiment, the proxy resource intercepts the request from the network application for an authorization server to provide the token.

According to a disclosed embodiment, the proxy resource is a software agent running on a machine that runs the network application.

According to a disclosed embodiment, the proxy resource is a proxy server separate from a machine that runs the network application.

According to a disclosed embodiment, the operations further comprise auditing access by the network application to the destination network resource.

According to a disclosed embodiment, the operations further comprise auditing access by a plurality of network applications to a plurality of destination network resources.

Further embodiments described herein relate to dynamically and proactively scanning a computing environment for application misconfiguration security threats. For example, according to some embodiments there may be a non-transitory computer readable medium including instructions that, when executed by at least one processor, cause the at least one processor to perform operations for dynamically and proactively scanning a computing environment for application misconfiguration security threats. Operations may comprise identifying an application configured for network communications; analyzing a network security configuration of the application; identifying, based on the analyzing, a target network address that the application is configured to use to redirect a network device to a target network resource; comparing the target network address to a whitelist of trusted target network addresses; assessing, based on the comparing, whether the network security configuration is misconfigured; and determining, based on the assessment; whether to provide a configuration validation status for the application.

According to a disclosed embodiment, the identifying of the application occurs as part of a scan of a computing environment comprising multiple applications.

According to a disclosed embodiment, the network security configuration of the application is an OAuth configuration.

According to a disclosed embodiment, the target network resource is a network resource accessible by the network device conditional on the network device asserting an access token.

According to a disclosed embodiment, the access token is dynamically provisioned by an authorization server.

According to a disclosed embodiment, when the target network address is not included in the whitelist of trusted target network addresses, the operations further comprise disabling network communications capabilities for the target network address.

According to a disclosed embodiment, when the target network address is not included in the whitelist of trusted target network addresses, the operations further comprise generating an alert identifying the target network address.

According to a disclosed embodiment, the operations further comprise determining, based on the target network address, whether an identity associated with the network device has sufficient privileges to access the target network resource.

According to a disclosed embodiment, the operations further comprise determining, based on the target network address, whether an identity associated with the network device can elevate its privileges by accessing the target network resource.

According to a disclosed embodiment, the operations further comprise performing, based on the determining whether the identity can elevate its privileges, at least one of: disabling the network device from accessing the target network resource or generating an alert.

According to another disclosed embodiment, a method may be implemented for dynamically and proactively scanning a computing environment for application misconfiguration security threats. The method may comprise identifying an application configured for network communications; analyzing a network security configuration of the application; identifying, based on the analyzing, a target network address that the application is configured to use to redirect a network device to a target network resource; comparing the target network address to a whitelist of trusted target network addresses; assessing, based on the comparing, whether the network security configuration is misconfigured; and determining, based on the assessment, whether to provide a configuration validation status for the application.

According to a disclosed embodiment, the identifying of the application occurs as part of a scan of a computing environment comprising multiple applications.

According to a disclosed embodiment, the network security configuration of the application is an OAuth configuration.

According to a disclosed embodiment, the target network resource is a network resource accessible by the network device conditional on the network device asserting an access token.

According to a disclosed embodiment, the access token is dynamically provisioned by an authorization server.

According to a disclosed embodiment, when the target network address is not included in the whitelist of trusted target network addresses, the operations further comprise disabling network communications capabilities for the target network address.

According to a disclosed embodiment, when the target network address is not included in the whitelist of trusted target network addresses, the operations further comprise generating an alert identifying the target network address.

According to a disclosed embodiment, the operations further comprise determining, based on the target network address, whether an identity associated with the network device has sufficient privileges to access the target network resource.

According to a disclosed embodiment, the operations further comprise determining, based on the target network address, whether an identity associated with the network device will elevate its privileges by accessing the target network resource.

According to a disclosed embodiment, the operations further comprise performing, based on the determining, at least one of: disabling the network device from accessing the target network resource or generating an alert.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIGS. 2A-2K are exemplary illustrations of system operations for securely validating access tokens in accordance with disclosed embodiments.

DETAILED DESCRIPTION

Figure 1A:
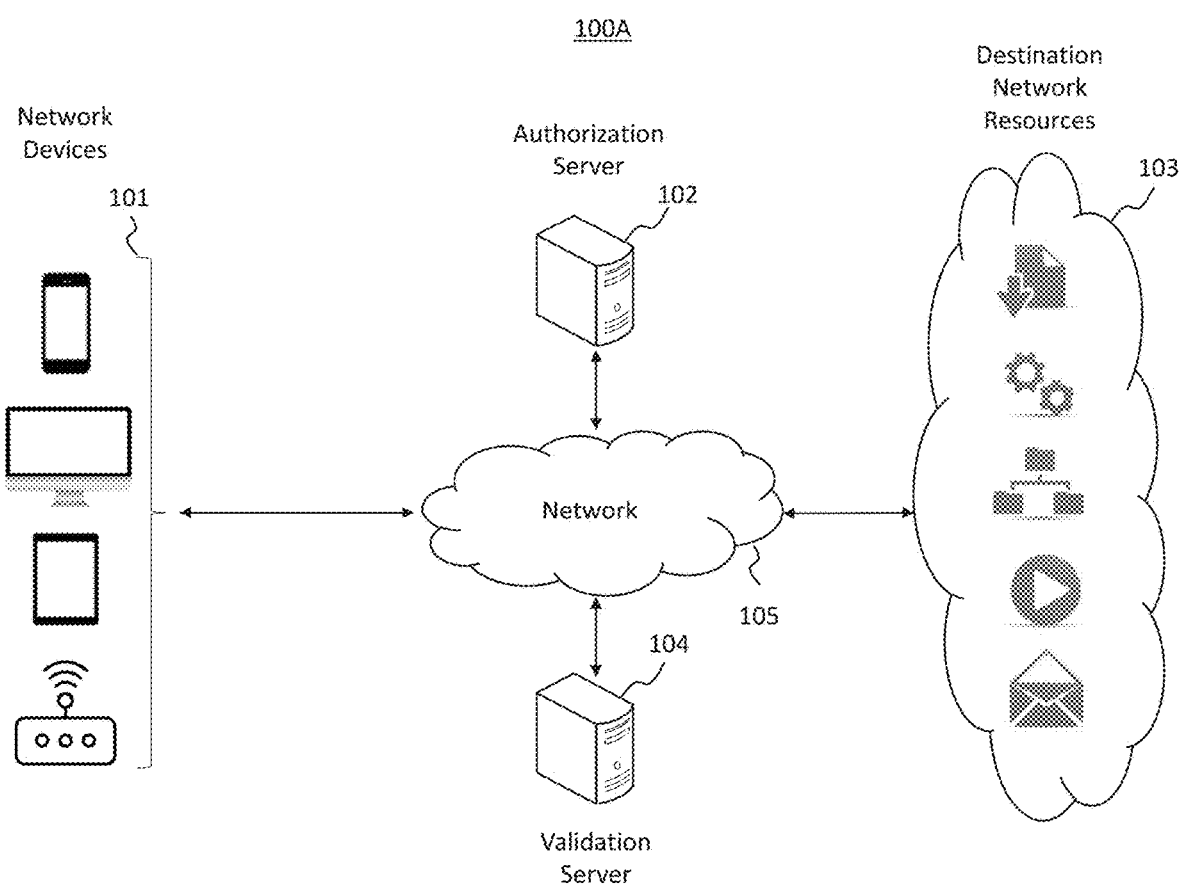
FIG. 1A is a block diagram of an exemplary system for securely validating access tokens in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

In accordance with disclosed techniques, a token validation resource (e.g., dedicated server, proxy server, agent, etc.) may be configured to perform a validation process for access tokens that it receives. The access tokens may have been provided by an authorization server (e.g., an OAuth authentication server), an authentication server (e.g., an OpenID authentication server), or other types of access-control servers. By analyzing and validating certain parameters of the token or its accompanying message (e.g., a destination network address, such as a URL), the token validation resource can determine whether the user or client application should be permitted to send the access token to a target resource corresponding to the destination network address. If the access token contains a malicious or fake URL (e.g., caused to be inserted by an attacker who has taken control of the target resource), the token validation resource may prohibit the token from being sent to the URL. Similarly, if the access token is created such that it will reach a compromised target resource having a different address than that in the token, it may be detected as illegitimate by the token validation resource. Thus, even if the access token itself does not contain the network address of the target resource, the token validation resource may still identify it as potentially malicious or illegitimate. Further types of security checks may also be performed on the token, as discussed below.

Additional disclosed techniques involve proactively scanning applications that are configured for network communications (e.g., browsers, social media applications, entertainment applications, financial services applications, database applications, etc.) and inspecting them for embedded (e.g., programmed or stored) network addresses. The identified network addresses may then be compared against a list (e.g., whitelist or blacklist) to determine whether the addresses are valid or potentially malicious. Based on this comparison, a report may be generated indicating whether the application is properly configured or misconfigured. These and the additional techniques discussed below overcome several technological security vulnerabilities and inefficiencies in prior systems.

Reference will now be made in detail to the disclosed embodiments, examples of which are illustrated in the accompanying drawings.

FIG. 1A is a block diagram of an exemplary system 100A for securely validating access tokens. In accordance with system 100, various types of network devices 101 may seek access to various destination network resources 103. In order to obtain secure and access-protected access to destination network resources 103, destination network resources 103 may implement authorization or authentication protocols such as OAuth, OpenID, or various others. Accordingly, network devices 101 may seek access to destination network resources 103 and then be redirected to authorization server 102. The authorization server 102 may provide an access token and redirect the user to a validator server 104 that is configured to validate attributes of the access token or its accompanying message (e.g., a URL or URI for the destination network resources 103). These elements of FIG. 1A and these functions are further discussed below.

Network devices 101 may include one or more of a wide variety of computing devices, such as desktop computers, laptops, tablets, smartphones, smart clothing, computer-embedded jewelry, computer-enabled applicants, various types of IoT devices, and other network-connected devices. In accordance with disclosed embodiments, network devices 101 may have one or more hardware processor, memory, and network adapter. Such network adapters may enable the network devices 101 to communicate across network 105, which may be, in whole or part, the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network (e.g., 4G, 5G, etc.), an enterprise or private data network, a storage area network, a virtual private network using a public network, a nearfield communications technique (e.g., Bluetooth™, infrared, etc.), or various other types of network types.

As described below, network devices 101 may run applications that are configured to perform such network communications with destination network resources 103. Examples of network device 101 applications may include Internet browsers (e.g., Internet Explorer™, Chrome™, Firefox™, Safari™, etc.), social media applications (e.g., Facebook™, Twitter™, Instagram™, LinkedIn™, etc.), entertainment or gaming applications (e.g., YouTube, Minecraft™, Roblox™ Spotify™, Netflix™ etc.), financial services applications (e.g., Fidelity™ Charles Schwab™, Mint™, etc.), IoT-type applications (e.g., device-specific applications from Nest™, TeslaT™, Samsung™ LG™ etc.), email applications (e.g., Gmail™, Outlook™ Yahoo™, AOL™ etc.), database applications (e.g., Microsoft SQL Server™, Oracle™, MySQL™, QuickBase™, etc.), and many more. It is to be understood that network devices 101 may utilize a wide variety of applications, whether among the foregoing categories or other categories.

Corresponding to these various applications on network devices 101, destination network resources 103 may include servers or databases that provide content or store data for use by such applications. Thus, destination network resources 103 may include webservers, application servers, databases, or other network resources that store user data, financial data, IoT data, or various other types of data that users of network devices 101 may access. Because some of such data may be private or sensitive (e.g., a user's personal data, confidential business documents, etc.), secure techniques are needed to control access to the data at destination network resources 103. As discussed below, this may be achieved through the disclosed techniques.

In some embodiments, destination network resources 103 may include one or more of different types of virtual computing instances. For example, some or all of destination network resources 103 may take the form of one or more virtual machines, container instances, or other types of virtualized instances, which may be based on virtualization tools provided by Amazon Web Services™ (AWS™) Microsoft Azure™, IBM Cloud™, Docker™, Google Cloud Platform™, Cisco Metapod™ Joyent™, vmWare™, or various others. In various embodiments, the virtual computing environment hosting the virtualized instances may be created or controlled by a cloud orchestrator, which may be based on platforms such as AppFormix™, BMC Cloud LifeCycle Management™, IBM Cloud Orchestrator™, AWS CloudFormation™, Kubernetes™, or others. Further, the virtual computing environment may be a robotic automation platform for robotic process automation. The robotic automation platform may be based on tools such as Blue Prism™, UiPath™, Pega™, Verint™, or others. In additional embodiments, the virtual computing environment may be based on, or interface with, a continuous development or continuous deployment (e.g., DevOps) environment such as those provided by Jenkins™, Kubernetes™, Ansible™, Chef™, Puppet™, Bamboo™, VMware ESXi™, etc., to continuously build, test, and deploy code or to perform other automation functions.

As shown in FIG. 1A, system 100A may also include an authorization server 102. Consistent with below embodiments, authorization server 102 may be an access-control or regulation server, such as an OAuth authorization server, an OpenID authentication server, or another type of access-control server. As discussed further below, authorization server 102 may generate access tokens for use by network devices 101 in seeking access to destination network resources 103. For example, if authorization server 102 is an OAuth authorization server, it may be configured to generate tokens according to the IETF's RFC 7519, "JSON Web Token (JWT)," RFC 7523, "JSON Web Token (JWT) Profile for OAuth 2.0 Client Authentication and Authorization Grants," or according to another standardized format or a proprietary format.

System 100A may also include one or more validation servers 104 in communication with network 105. Validation server 104 may perform certain token validation techniques, as discussed further below. In some embodiments, validation server 104 may also serve to interface with other network security platforms or applications, and thus may operate to generate reports or alerts when tokens that it inspects are not successfully validated. In some embodiments, validation server 104 may be a cloud-based or on-premises security server. For example, a network security services provider may implement validation server 104 to protect network devices 101 or to protect destination network resources 103. As an alternative, in some embodiments destination network resources 103 themselves may implement validation server 104 within their network or otherwise under their control. As still a further alternative, in some embodiments authorization server 102 itself may implement validation server 104 within its network or otherwise under its control.

Figure 1B:
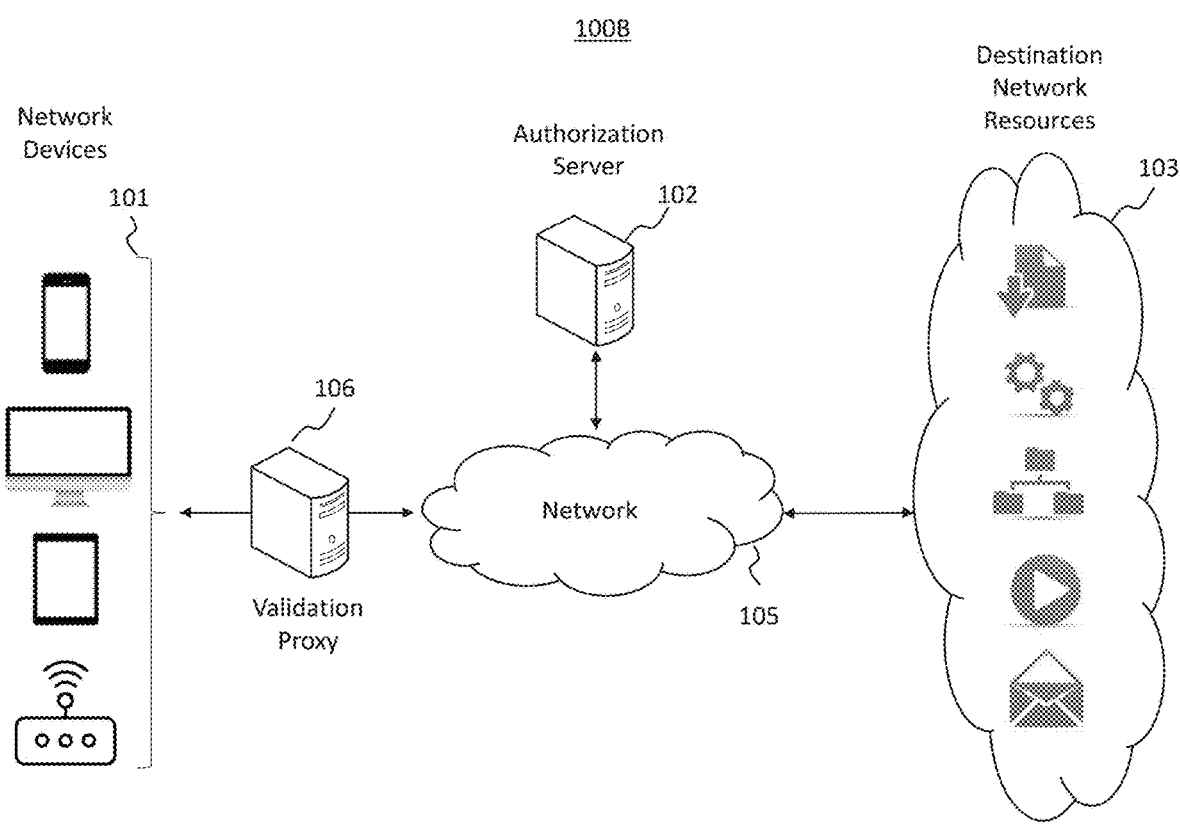
FIG. 1B is a block diagram of an exemplary proxy-based system for securely validating access tokens in accordance with disclosed embodiments.

FIG. 1B is a block diagram of an exemplary proxy-based system 100B for securely validating access tokens. In many respects, system 144E is the same as system 100A, as discussed above. One difference between these two illustrated systems, however, is that system 100B implements validation server 104 as a validation proxy 106. Accordingly, in this implementation validation proxy 106 may function to intercept requests from network devices 101 for access to destination network resources 103, and/or to intercept incoming communications (e.g., from destination network resources 103 or authorization server 102). For example, validation proxy 106 may be configured with a list of particular destination network resources 103 (e.g., by URL, URI, IP address, etc.), and listen for outgoing communications from network devices 101 addressed to such addresses. Correspondingly, validation proxy 106 may also be configured with a list of network devices 101 (e.g., by IP address, MAC address, etc.), and listen for incoming communications to network devices 101 addressed to such addresses. As discussed further below, validation proxy 106 may operate similar to validation server 104 in terms of its token inspection and validation operations.

As a further alternative, in some embodiments validation server 104 or validation proxy 106 may be implemented by client agents or microservices embedded into network devices 101 themselves. In such embodiments, the agent or microservice operating on network devices 101 may also operate similar to validation server 104 or validation proxy 106, as discussed below. In particular, such an agent or microservice would function to inspect and validate tokens from authorization server 102 before they can be asserted by network devices 101 to destination network resources 103.

Figure 1C:
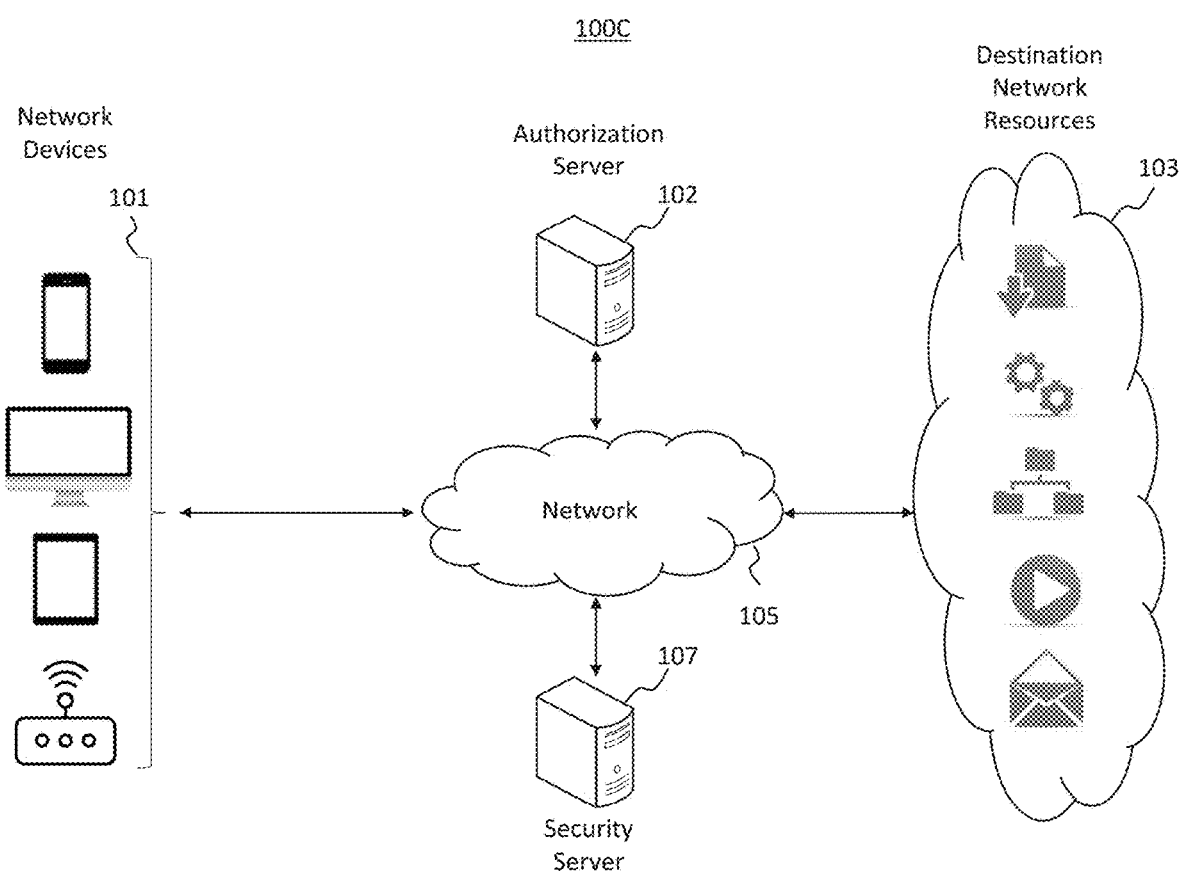
FIG. 1C is a block diagram of an exemplary system for dynamically and proactively scanning a computing environment for application misconfiguration security threats in accordance with disclosed embodiments.

FIG. 1C is a block diagram of an exemplary system 100C for dynamically and proactively scanning a computing environment for application misconfiguration security threats. In many respects, system 100C is the same as systems 100A and 100B. In addition, system 100C includes a security server 107, which may operate to perform the techniques described below in connection with FIG. 4. In particular, as discussed below, security server 107 may operate to perform a scan of authorization server 102, or applications installed thereon, and look for security configuration vulnerabilities. For example, authorization server 102 may maintain a whitelist or trusted list of network address information corresponding to destination network resources 103. Security server 107 may analyze this network address information to determine whether the listed network addresses are in fact valid or have been altered (e.g., by an attacker). Similarly, security server 107 may perform similar scanning and analysis operations for network devices 101, or applications installed thereon, and assess whether the applications have any security misconfiguration vulnerabilities. While security server 107 is depicted in FIG. 1C as separate from validation server 104 and validation proxy 106, in some embodiments these devices may be implemented as a single server or single proxy resource.

Figure 2A:
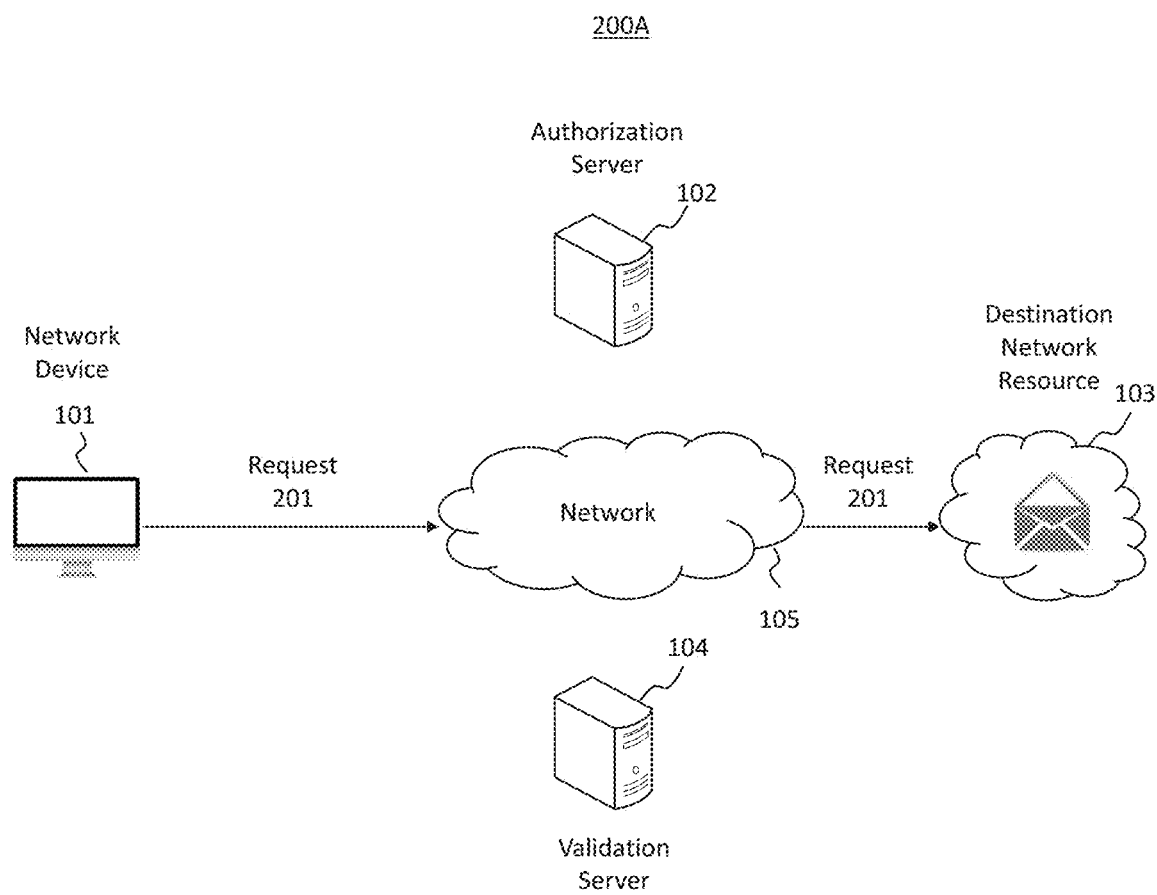

FIG. 2A is an exemplary illustration of a system 200A, where a network device 101 sends a request 201 for access to a destination network resource 103. Consistent with above embodiments, the request 201 may originate from a variety of different types of client applications running on network device 101, such as social media applications, entertainment applications, IoT applications, personal finance applications, email applications, database applications, maintenance or diagnostic applications, or various others. The request 201 may request, for example, user data or application data that is stored at destination network resource 103. Further, the request 201 may be a request for initial access (e.g., log-on) to a session at destination network resource 103. As illustrated, request 201 may pass through network 105 to destination network resource 103.

Figure 2B:
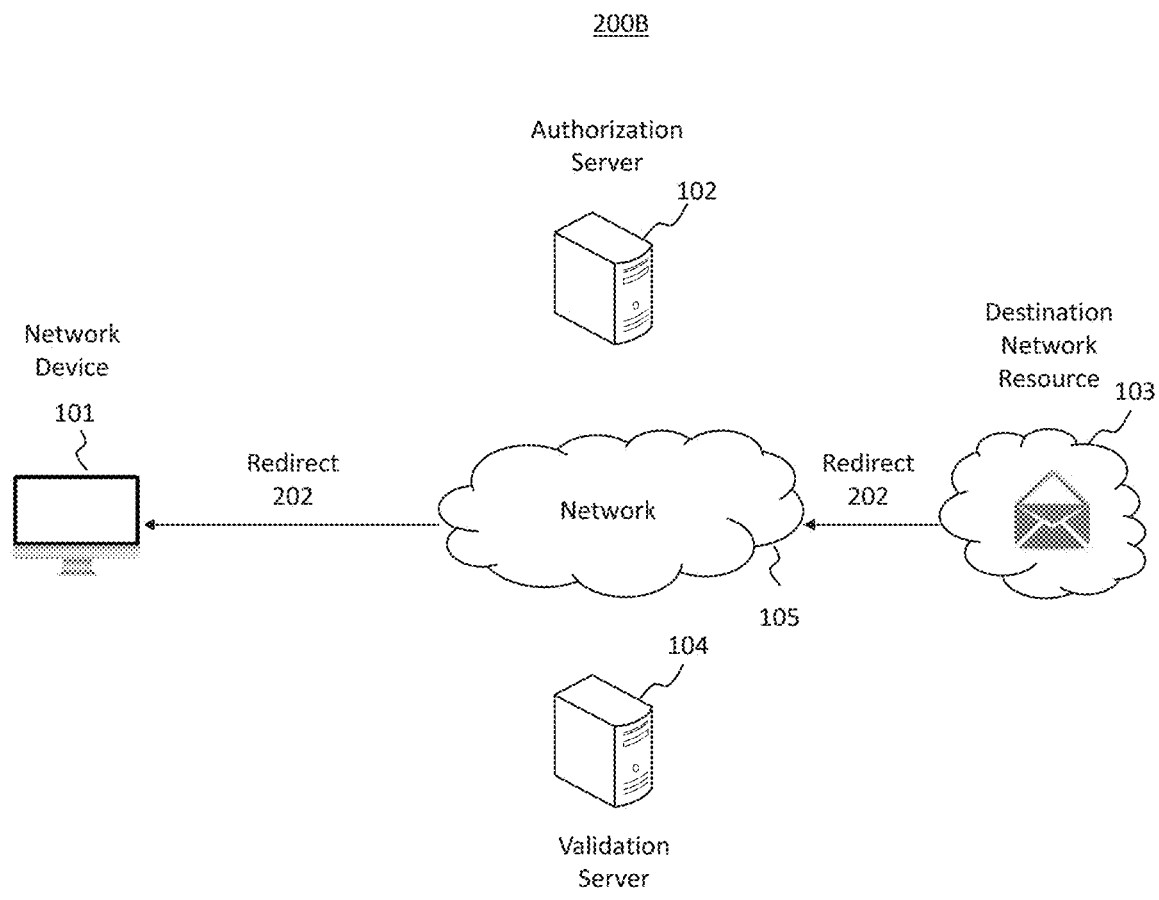

FIG. 2B is an exemplary illustration of a system 200B, where the destination network resource 103 that received the request 201 responds to the network device 101 with a redirect 202. The redirect 202 may be, for example, an HTTP redirect (e.g., a 301 redirect, 302 redirect, 303 redirect, 307 redirect, etc.), a JavaScript redirect, etc. The redirect 202 may include (e.g., as an HTTP field) a network address (e.g., URL, URI, IP address, etc.) for authorization server 102. In some embodiments redirect 202 may comply with an authorization or authentication protocol, such as OAuth, OpenID, or others.

Figure 2C:
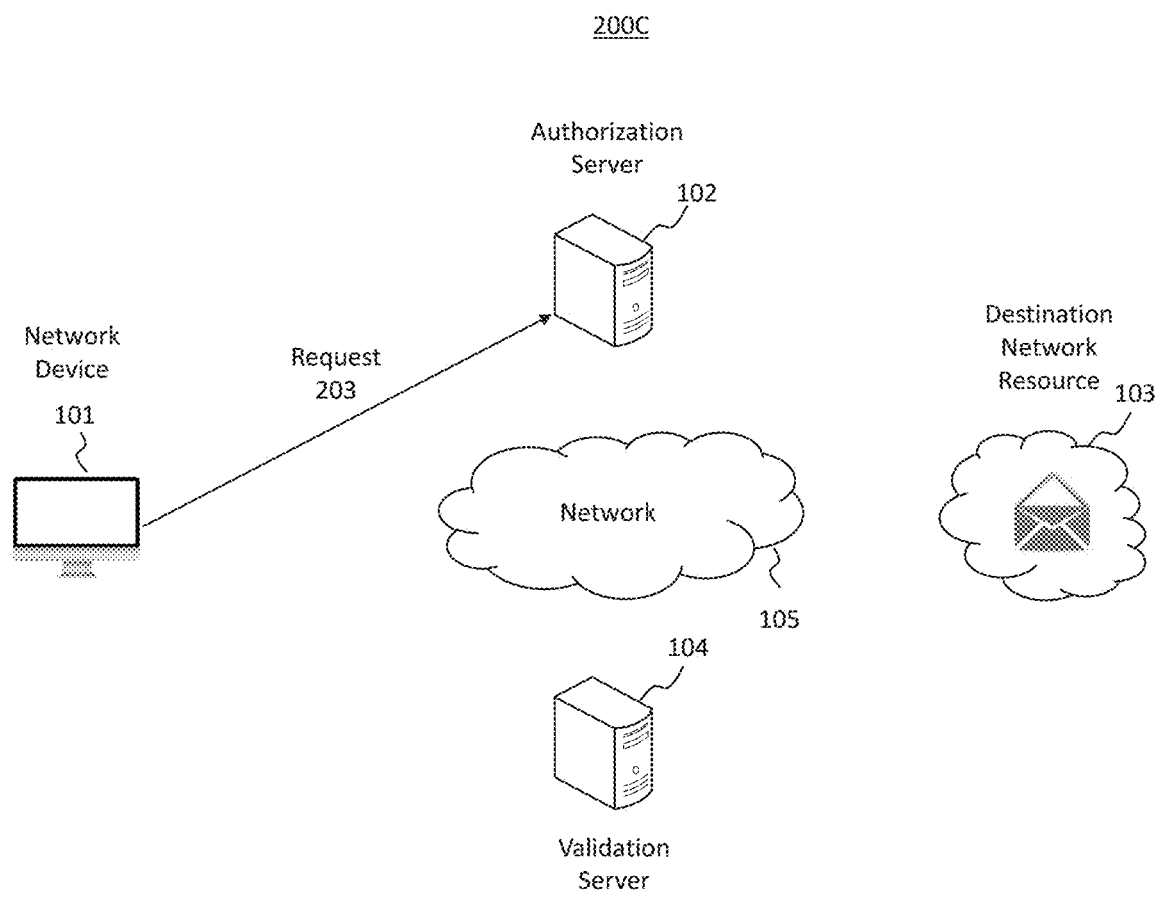

Accordingly, when network device 101 receives the redirect 202, it may send a request 203 to the network address specified in the redirect for authorization server 102, as shown in FIG. 2C and system 200C. Consistent with system 200C, request 203 may be a request to authorization server 102 for creating an access token. While in some embodiments request 203 may explicitly request the creation of an access token, in some embodiments request 203 may simply be a request identifying the destination network resource 103 that the network device 101 seeks to access, and in the latter case authorization server 102 may interpret the request 203 as a prompt to generate an access token.

Figure 2D:
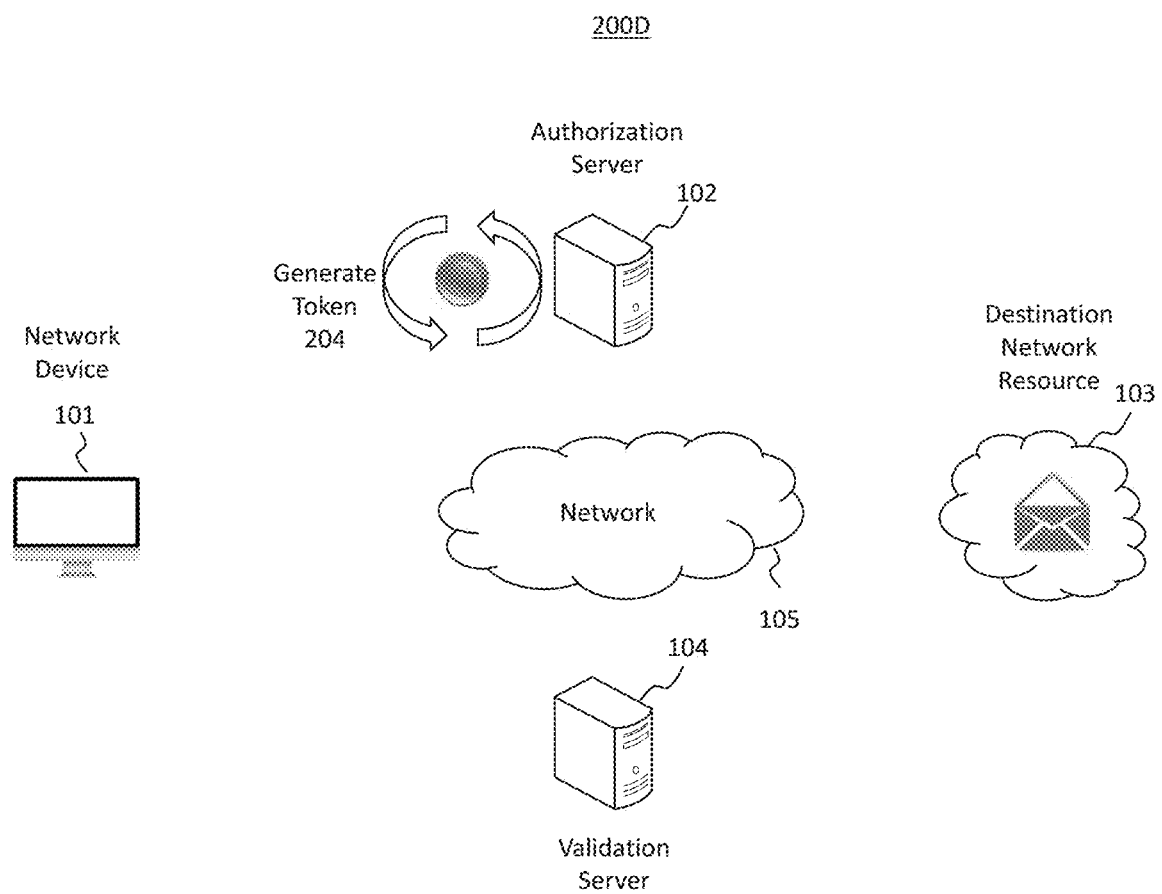

FIG. 2D illustrates an exemplary system 200D where authorization server 102 generates an access token in operation 204. In some embodiments, authorization server 102 may automatically (e.g.; dynamically, or on-demand) generate the access token based on request 203. Alternatively, in some embodiments authorization server 102 may perform a security check on network device 101 before generating the token. The security check may include, for example, verifying an identity associated with the network device (e.g., based on its IP address, MAC address, user name, device name, etc.), applying a security policy that governs creation of access tokens for network device 101, prompting the network device 101 for authentication (e.g., a password, token, key, certificate, etc.), or other techniques. In some embodiments, tokens generated by authorization server 102 may be dynamically generated, That is, they may be generated in response to request 203 on-demand and as needed.

As discussed above, the token may comply with an authorization or authentication protocol (e.g., OAUth, OpenID, etc.), and may enable network device 101 to access destination network resource 103. In particular, in some embodiments the token may be sufficient, by itself, for the network device 101 to obtain access to the destination network resource 103. In such embodiments, a user of network device 101 need not separately enter a password or provide some other credential to destination network resource 103, While the access token is thus powerful, it can also lead to security vulnerabilities, as discussed above. If a malicious user wrongfully obtains the token, they may be able to impersonate the network device 101 (or an application or identity thereof), and obtain unauthorized access to destination network resource 103. The techniques below are designed to protect against this security threat.

Figure 2E:
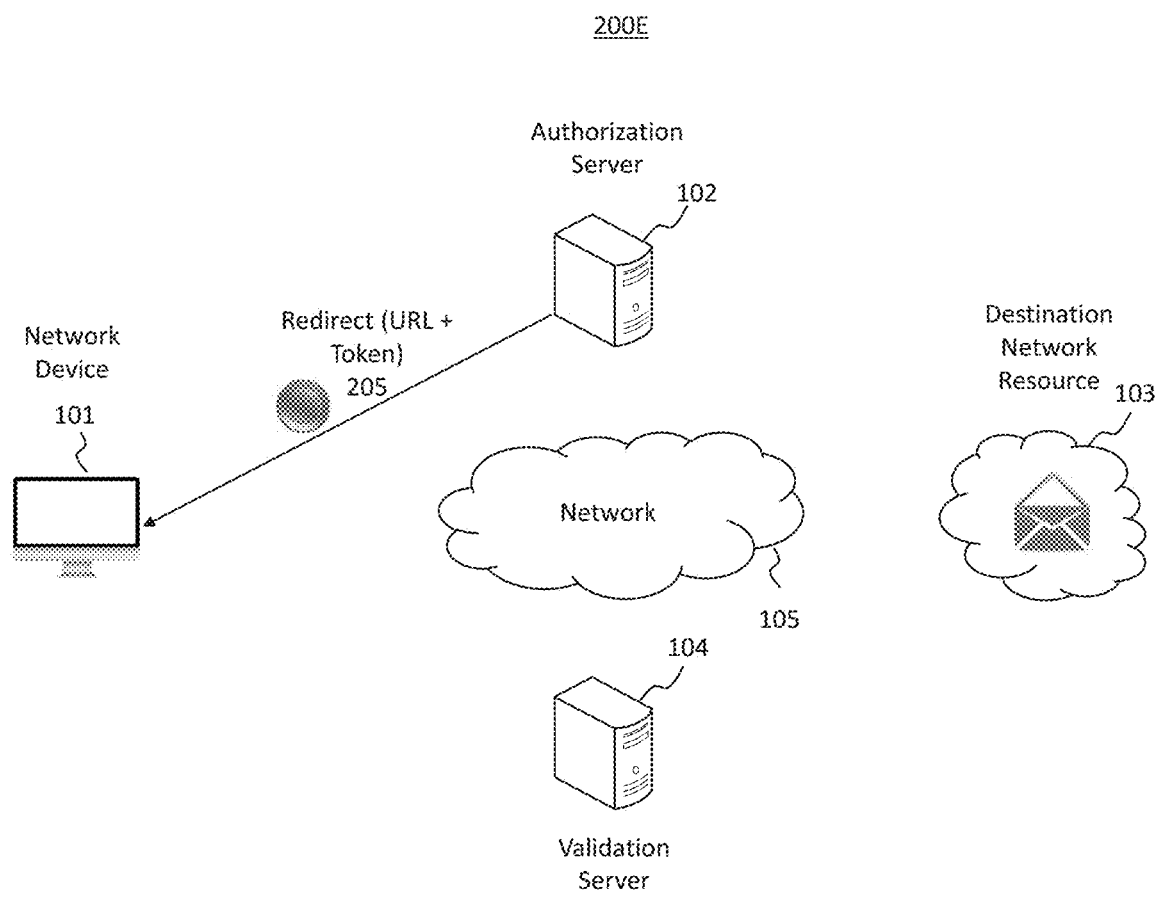

FIG. 2E illustrates an exemplary system 200E in which authorization server 102 returns the token to the network device 101 with a redirect in operation 205. As with redirect 202, redirect 205 may be an HTTP redirect, JavaScript redirect, etc. The redirect may include (e.g., as an HTTP field) a network address (e.g., URL, URI, IP address, etc.) for the validation server 104.

Figure 2F:
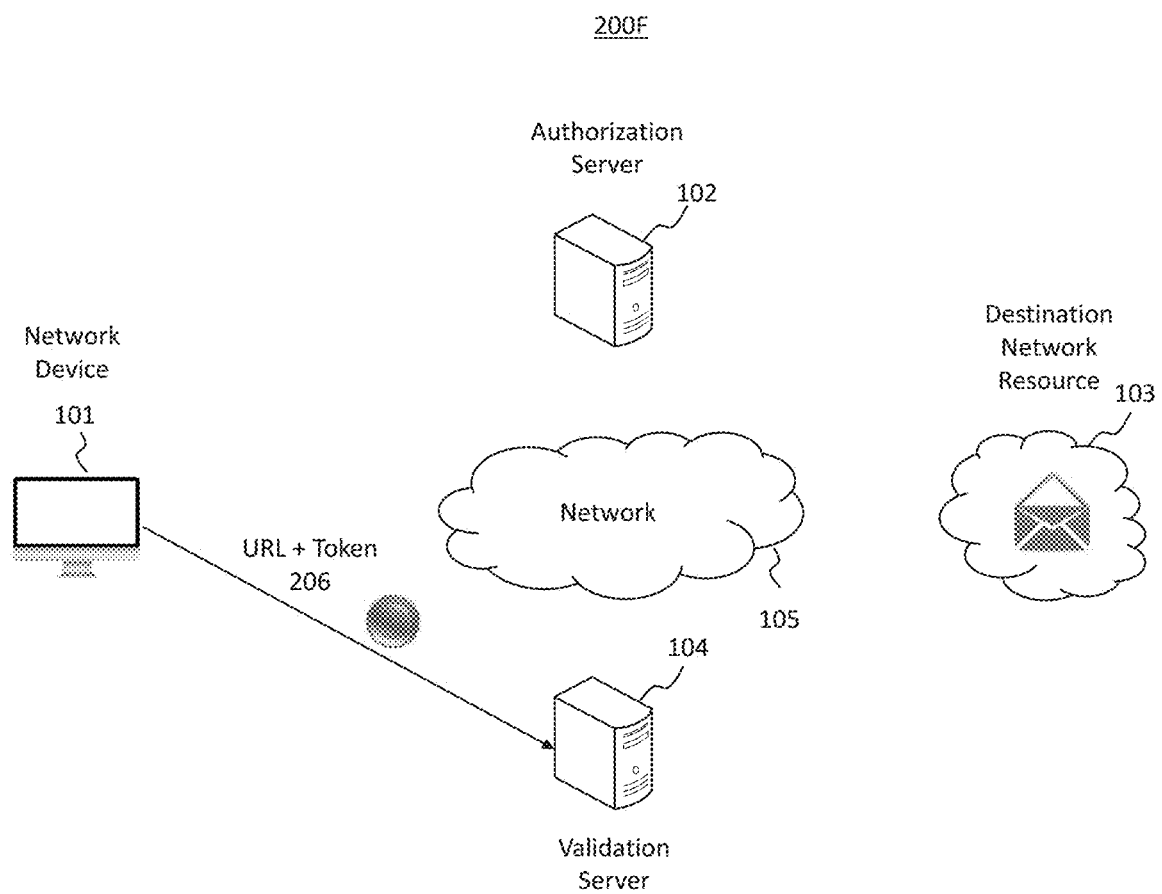

Thus, as shown in FIG. 2F and system 200F, once the network device 101 receives the redirect 205 it may send the token to the validation server 104 in operation 206. In some embodiments, the token may include (e.g., as a token field) network address information associated with destination network resource 103. Alternatively, the message conveying the token to validation server 104 (or a separate message) may identify the network address of destination network resource 103. Of course, if a malicious user has compromised destination network resource 103 and inserted their own fictitious network address, the network address may not be for destination network resource 103 itself, but rather for a device controlled by the malicious user.

Figure 2G:
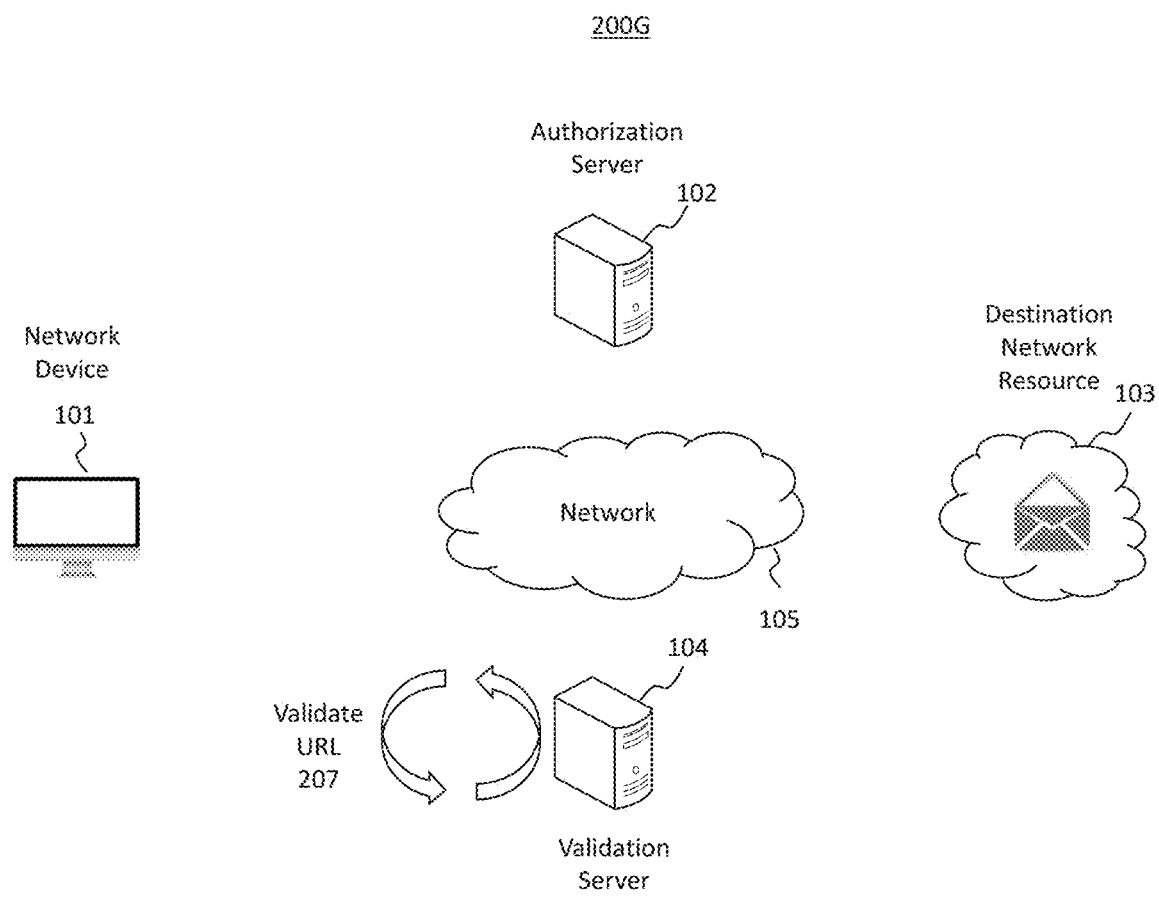

FIG. 2G illustrates an exemplary system 200G, where the validation server 104 validates one or more attributes of the token in operation 207. For example, the validation server 104 may parse the token for network address information and compare any identified network address information against a whitelist and/or blacklist. Using such techniques, if the token includes (or its carrying message includes) a valid network address for destination network resource 103, the network address will be found on the whitelist of validation server 104. Alternatively, if an attacker has gained control over the destination network resource 103 (or a portion thereof), the attacker may have provided a false or fictitious network address that it controls, which may be included in the token. The attacker may do this so that it receives legitimate access tokens generate by authorization server 102, essentially indirectly intercepting them from destination network resource 102. In this event, the false or fictitious network address that the attacker has included will not be found on the whitelist maintained by the validation server 104. Correspondingly, if the particular false or fictitious network address is known to be malicious, it may be included on a blacklist maintained by validation server 104. In either scenario (e.g., the network address not appearing on the whitelist, or the network address appearing on the blacklist), validation server 104 may decline to validate the token.

In some embodiments, validation server 104 may validate other aspects of the token instead or in addition to a network address. For example, validation server 104 may validate a certificate (e.g., digital certificate) associated with the destination network resource 102 and confirm it is legitimate (e.g., based on reference to a certificate authority, or by performing a hash function on the certificate). Further, in some embodiments the validation server 104 may confirm whether the network address information for the destination network resource 103 is within a known or permitted range of IP addresses, or has a DNS records history that includes the destination network resource 102.

Figure 2H:
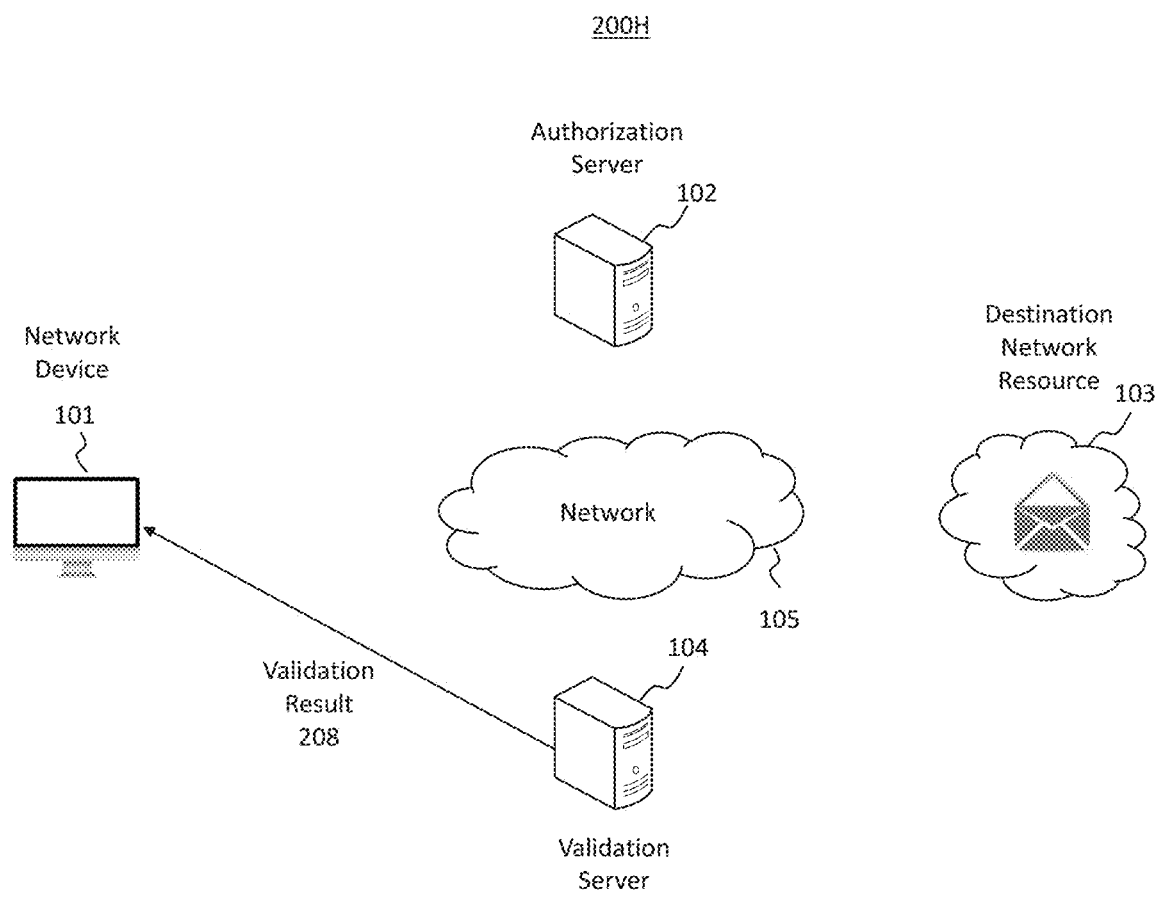
Figure 21:
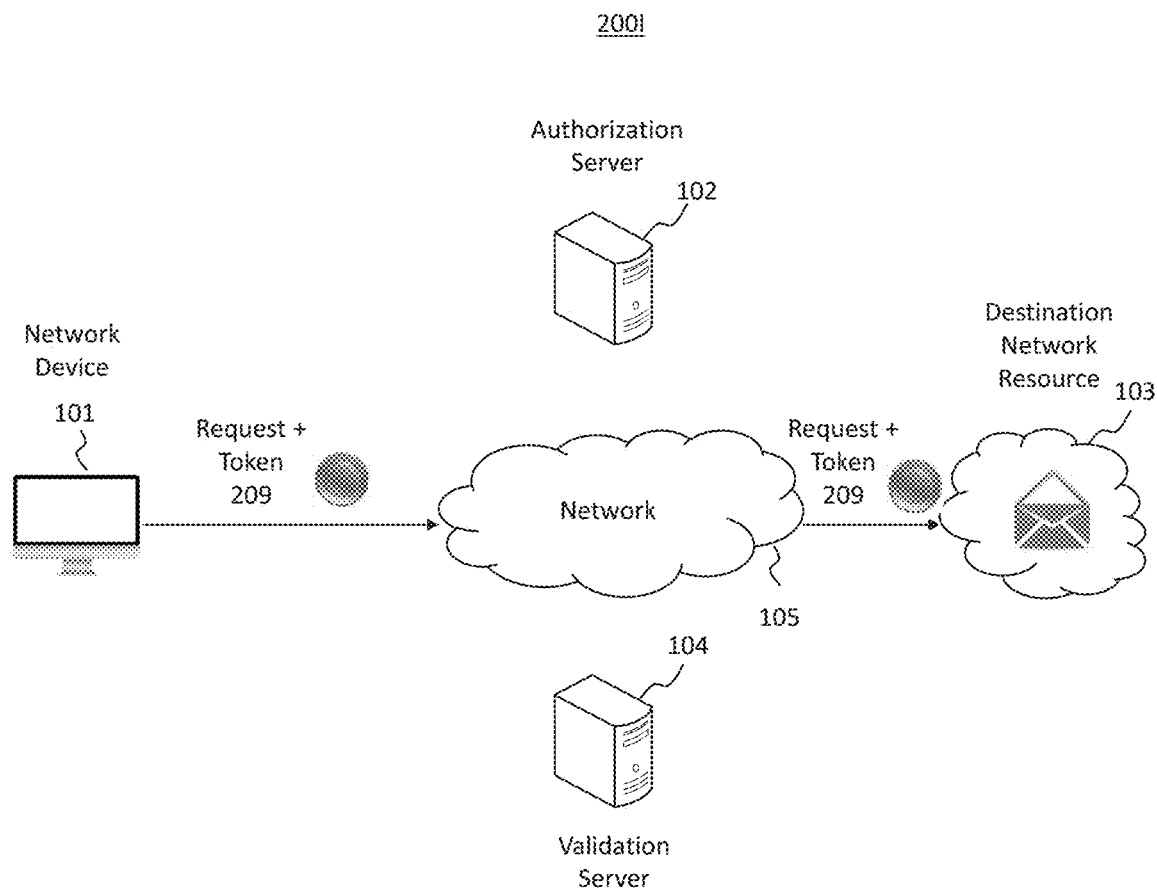

Accordingly, as shown in FIG. 2H and system 200H, validation server 104 may return a validation result in operation 208 to network device 101. If the token has been validated (e.g., the network address it includes is confirmed against a whitelist), the validation result 208 may be a success report, thereby allowing the network device 101 to assert the token to destination network resource 103. Alternatively, if the validation result 208 indicates that the token was not validated (e.g., because its network address data was not included on the whitelist, or was included on/the blacklist), network device 101 may be prohibited from asserting the token. For example, in this event the validation result 208 may trigger deleting the token, disabling the token (e.g., by erasing certain fields, such as network address fields), sending the token to a security server (e.g., security server 107 of FIG. 1C), or taking other security measures. Similarly, while FIG. 2H depicts validation result 208 being sent to network device 101 itself, in some embodiments the validation result 208 may be sent additionally, or exclusively, to a security server (e.g., security server 107).

In some embodiments, validation server 104 may include additional information as part of validation result 208 for enhanced security. For example, validation server 104 may generate a cryptographic signature of the token based on a cryptographic key. The key may be, for example, a private key, where the destination network resource 103 maintains a corresponding public key. Alternatively, both keys may be symmetric keys. As another example, validation server 104 may generate an additional token. As a further example, validation server 104 may generate a unique hash of the token. If any of these additional security techniques are implemented, the product of the technique (e.g., a cryptographic signature, additional token, or hash) may be included with validation result 208 and provided to network device 101, for network device 101 to additionally assert to destination network resource 103, FIG. 2I illustrates an exemplary system 200I where network device 101 asserts the token in a request 209 to the destination network resource 103. In accordance with the above discussion, request 209 may occur when the token successfully undergoes a validation process consistent with FIG. 2G, and thus the validation result 208 in FIG. 2H is positive. If the validation result 208 is not positive, network device 101 may have been disabled or prohibited from asserting the token at all.

Figure 2J:
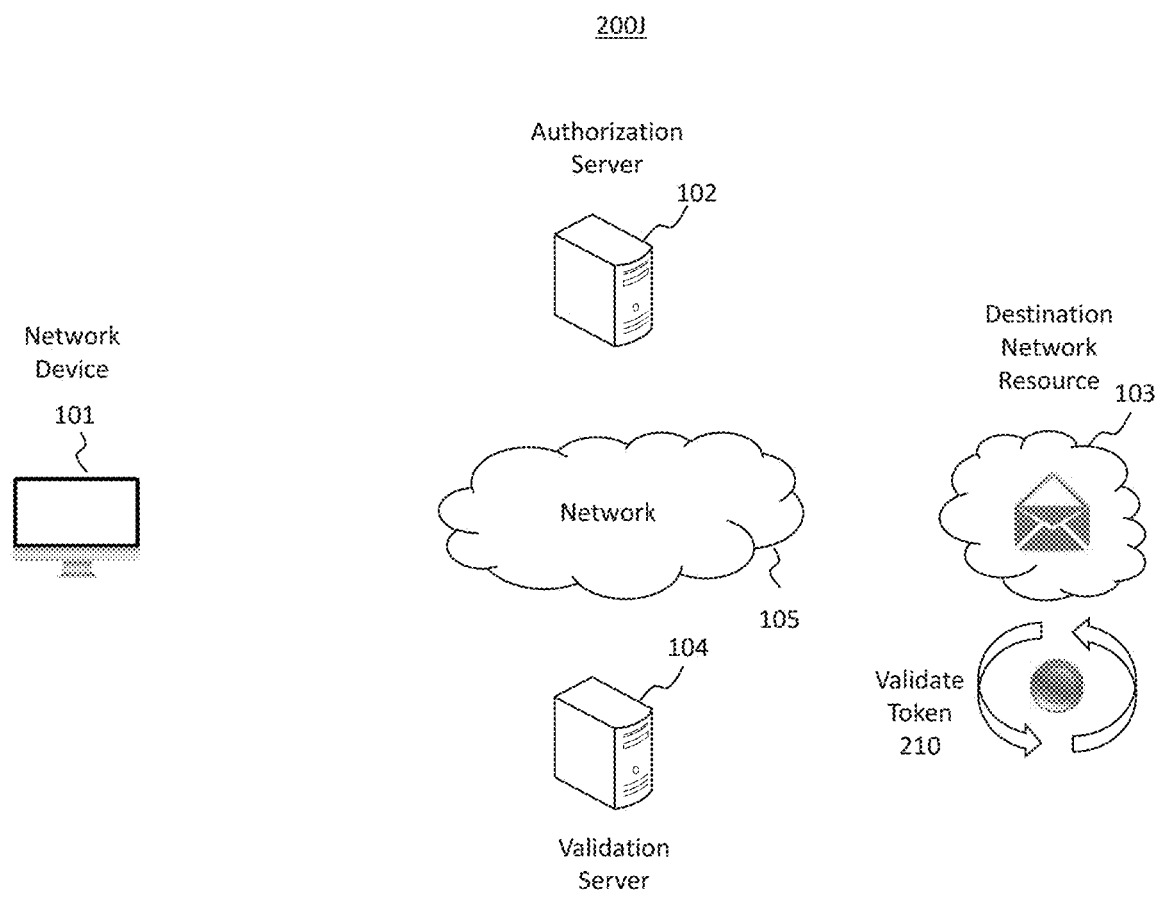

FIG. 2J illustrates an exemplary system 200J where the destination network resource 103 validates the token in operation 210. For example, if the token is an OAuth or OpenID token, the destination network resource 103 may validate the token in accordance with those protocols. Further, in some embodiments additional security measures may be provided. For example, in some embodiments validation server 104 may be configured to cryptographically sign tokens, generate additional tokens, or provide unique hash information to network device 101 as part of providing the validation result 208. If such additional security measures have been taken by validation server 104, the token validation in operation 210 may also take them into account. For example, if validation server 104 provided a cryptographic signature of the token, that signature may be verified in operation 210. Further, if validation server 104 generated an additional token or provided a unique hash, that additional token or hash may also be verified in operation 210.

Figure 2K:
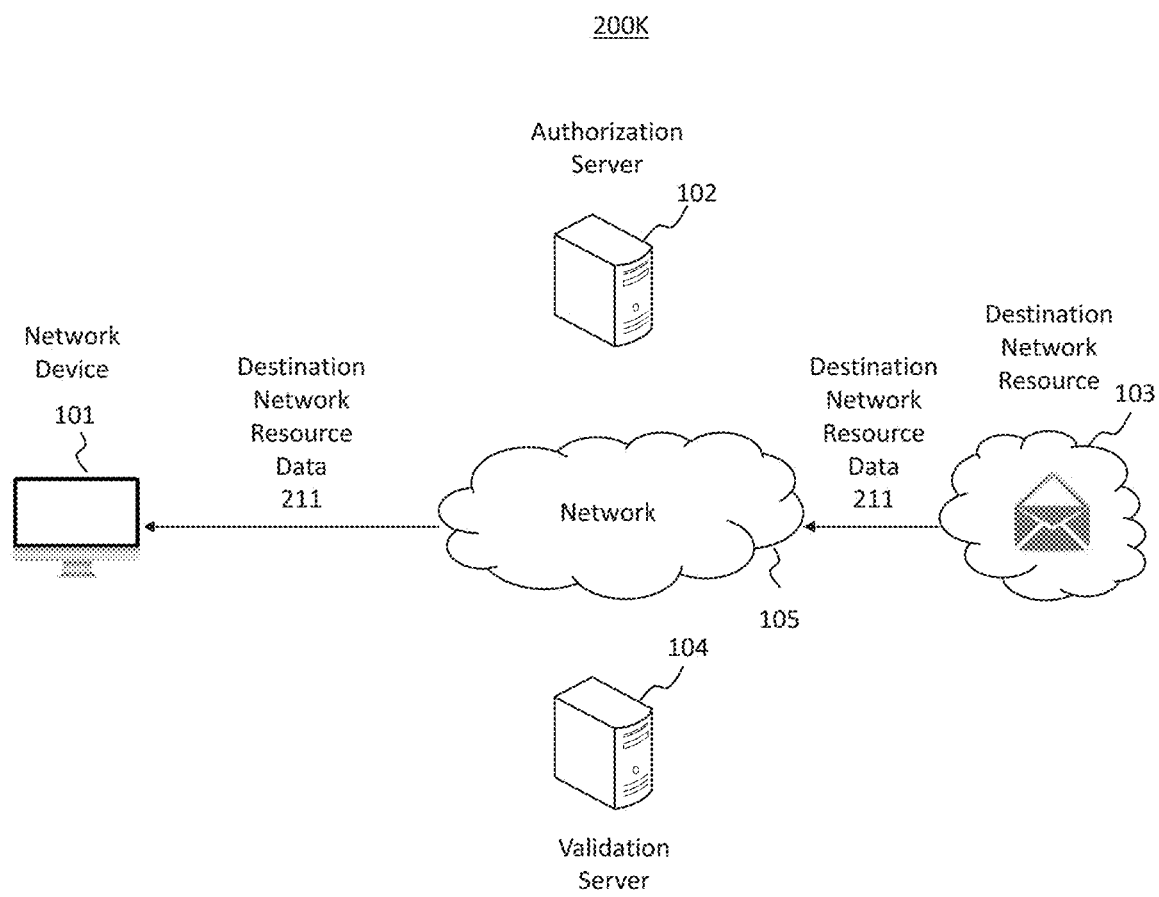

Once the token has been validated in operation 210, the destination network resource 103 may provide data 211 to network device 101, as shown in FIG. 2K and system 200K. Consistent with the above embodiments, the destination network resource data 211 may take a variety of forms, such as personal data, multimedia data, IoT device data, financial data, email data, database data, etc. Further, in embodiments where network device 101 is seeking to begin a session with destination network resource 103, the destination network resource data 211 may be session initiation data. Notably, in embodiments as described above, it may be unnecessary for the network device 101 to separately enter a password or provide an authentication credential to destination network resource 103 in order to obtain the destination network resource data 211. Instead, access to such data is enabled in a secure manner while maintaining usability.

Figure 3:
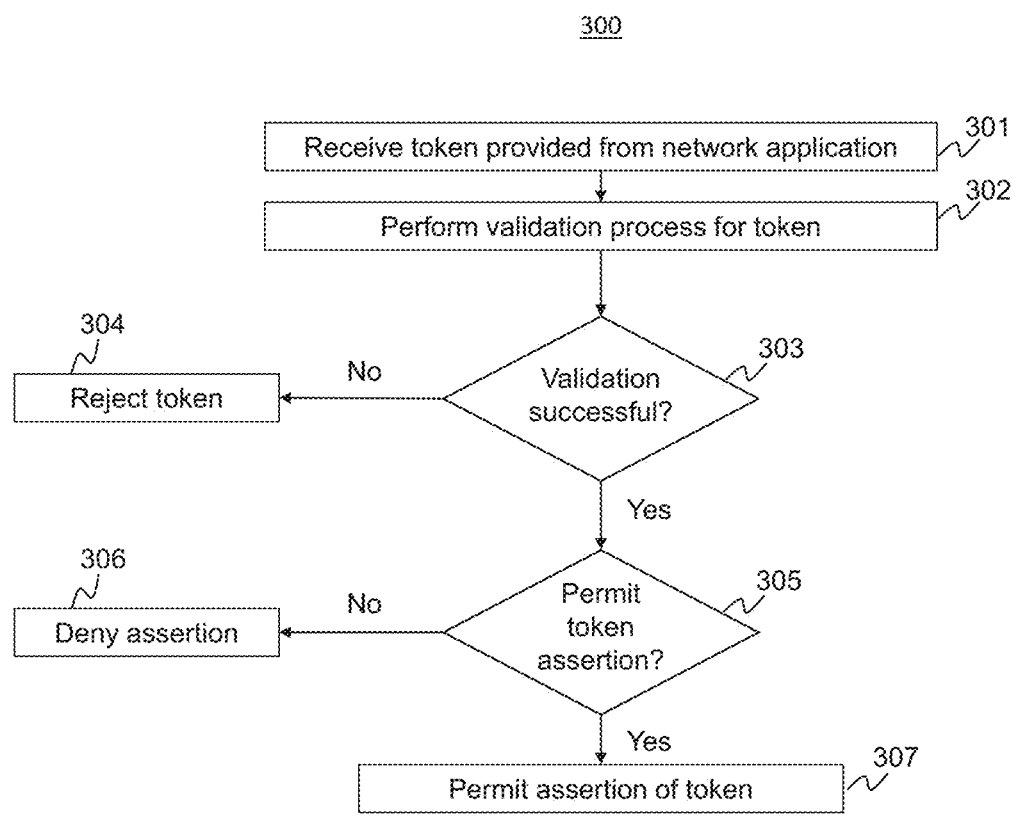
FIG. 3 is an exemplary flowchart depicting a process of securely validating access tokens in accordance with disclosed embodiments.

FIG. 3 is an exemplary flowchart depicting a process 300 of securely validating access tokens. Consistent with above embodiments, process 300 may be carried out by validation server 104, validation proxy 106, or security server 107, in concert with network devices 101, destination network resources, and authorization server 102.

In operation 301, process 300 may include receiving, at a token validation resource, a token provided from a network application, the token having an associated destination network address. For example, as discussed in connection with FIG. 2F, validation server 104 may receive a token in operation 206. The token may have been provided by network device 101 and may have a destination network address corresponding to destination network resource 103—that is, if the token is legitimate). If the token is illegitimate, the token may have a network address corresponding to a device controlled by an attacker. While the token may arrive at validation server 104 from network device 101, the token may have been dynamically generated by authorization server 102 in operation 204, as discussed above in connection with FIG. 2D.

In operation 302, process 300 may include performing a validation process for the token, the validation process being based on at least the destination network address associated with the token. For example, as discussed in connection with FIG. 2G, validation process 207 may include inspecting the token (or an accompanying message) for network address data. This may include comparing the network address data to a whitelist and/or blacklist, as discussed above.

In operation 303, process 300 may determine whether the validation process was successful. For example, if the network address data associated with the token is included on a whitelist maintained by validation server 104, the validation may be determined to be successful in operation 303. In that case, process 300 proceeds to operation 305. Alternatively, if the network address data associated with the token is included on a blacklist, or simply not included in a whitelist, validation operation 303 may determine that the validation is unsuccessful. In that event, process 300 proceeds to operation 304, where the token is rejected. As discussed above, rejection of the token in operation 304 may include additional operations such as deleting the token, instructing the network device 101 to delete the token, disabling the token (e.g., by changing its network address fields), sending a report or alert to a security server (e.g., security server 107), or other operations.

If the validation in operation 303 is successful and process 300 proceeds to operation 305, operation 305 may include determining whether to permit the network device 101 to assert the token. For example, if validation server 104 generated additional security data and provided it to network device 101, as discussed above, that additional security data may be verified before network device is permitted to assert the token to destination network resource 103. As noted above, the additional security data may include a cryptographic signature, an additional token, a hash value, or other data. If this additional data is present, and is verified in operation 305, process 300 may proceed to operation 307, where the network device 101 is permitted to assert the token to the destination network resource 103. Further, if this additional security data is not present and is not required, process 300 may still proceed to operation 307. Alternatively, if this additional security data is required and not present (or is present and is unsuccessfully verified in operation 305), process 300 may continue to operation 306. In operation 306, the network device 101 may be prohibited from asserting the token. For example, as discussed above, this may include deleting the token, instructing the network device 101 to delete the token, disabling the token, etc. Further, in some embodiments operation 306 may further include generating a report or alert regarding the unsuccessful verification of additional security data in operation 305.

Figure 4:
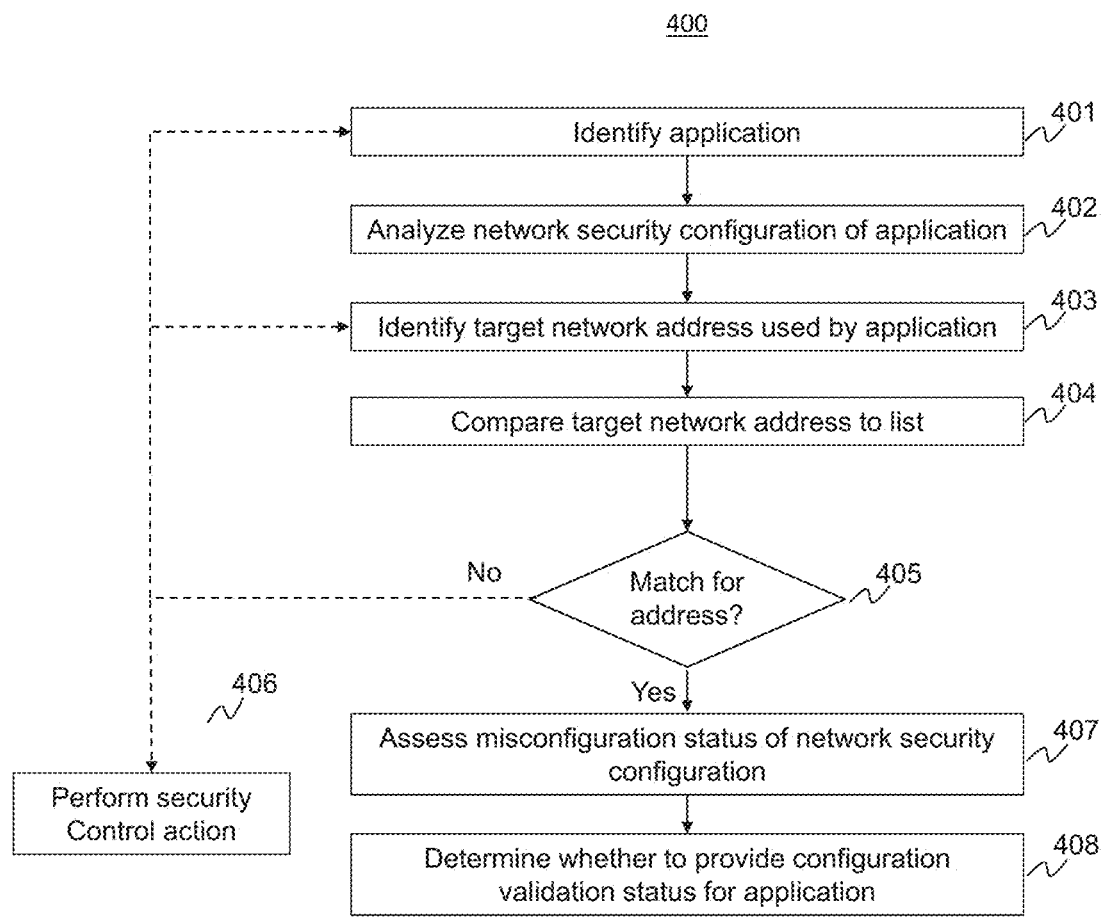
FIG. 4 is an exemplary flowchart depicting a process of dynamically and proactively scanning a computing environment for application misconfiguration security threats in accordance with disclosed embodiments.

FIG. 4 is an exemplary flowchart depicting a process 400 of dynamically and proactively scanning a computing environment for application misconfiguration security threats. Consistent with above embodiments, process 400 may be carried out by validation server 104, validation proxy 106, or security server 107.

As discussed above in connection with FIGS. 2A-2K and 3, security vulnerabilities may arise when applications running on network devices 101 are operated to send access tokens to malicious users. Malicious users can utilize the access tokens to impersonate the users and obtain their sensitive data from destination network resource 103. In addition to this type of security vulnerability, security threats may also arise when authorization server 102 is provided or programmed with network address information (e.g., URLs, URIs, IP addresses, etc.) for destination network resources 103 that it stores in a whitelist or other trusted list. Because authorization server 102 uses this whitelist or other trusted list to redirect network devices 101 to destination network resources 103, with an access token (or other sensitive data), misuse of the whitelist may result in an unauthorized entity receiving the access token (or other data). Similarly, applications on network device 101 may have embedded network address information (e.g., URLs, URIs, IP addresses, etc.) that they are configured to use for outbound communications. For example, some applications may maintain network address information that they are configured to use, some may further include such network address information in their own whitelist (i.e., trusted list), and others may be hardcoded with network address information (i.e., as part of the application's source code). However an application on network device 101 obtains the network address information it uses, such network address information can pose security threats. For example, if an attacker inserted the network address information to a device that they control, they may receive outbound connections from the network device 101, which may enable them to steal confidential data, credentials, and other information from the network device 101. The techniques of process 400 provide protection against these further types of security threats to authorization server 102 or network devices 101.

According to process 400, operation 401 may include identifying an application at authorization server 102, which is configured to store network address information corresponding to destination network resources 103. For example, authorization server 102 may store this network address information (e.g., IP addresses, URLs, URIs, etc.) in a whitelist or other trusted list. In some embodiments, authorization server 102 may use this list to redirect network devices 101 to destination network resources 103 together with an access token permitting network devices 101 to access destination network resources 103.

In additional embodiments, operation 401 may include identifying an application at network device 101 configured for network communications with a target network resource. For example, in operation 401 security server 107 may conduct a network scan operation. In some embodiments, this may involve scanning network device 101 and all of its installed applications. Alternatively, in some embodiments this may involve scanning a particular application on network device 101, or a particular category or type of application (e.g., Internet browsers). In further embodiments, operation 401 may include scanning a group of different network devices 101 (e.g., all devices of a particular type, all devices within an organization, all devices lacking a recent security upgrade, all devices associated with a defined group of users, etc.).

According to operation 402, process 400 may include analyzing a network security configuration of the application. For example, this may include accessing a list of network address data maintained by the application (e.g., in a cache, list, whitelist, etc.). As discussed above, this may be a whitelist maintained by authorization server 102. Alternatively, if the scan is a scan of computing device 101, the whitelist may be maintained by a computing device 101. Further, in some embodiments this may include accessing source code associated with the application and parsing the source code for network address information.

In operation 403, process 400 may include identifying, based on the analyzing, a target network address that the application is configured to use, either for redirecting a network device 101 to a destination network resource 103 or for a network device 101 itself to use to communicate with the destination network resource 103. For example, consistent with above embodiments this may include identifying a network address associated with destination network resource 103 (that is, if the network address information is legitimate) stored in a whitelist or trusted list at authorization server 102. Alternatively, the whitelist or trusted list may be part of an application on network device 101. If the network address information is not legitimate, it may not correspond to destination network resource 103, but rather may correspond to a device controlled by a malicious user. For example, if an attacker has control over a destination network resource 103, or a part of its environment, it may provide a fictitious network address to authorization server 102, which authorization server 102 may then include in a whitelist.

In operation 404, process 400 may include comparing the target network address information identified in operation 403 to a list of approved or legitimate network address information. For example, security server 107 may maintain a list of approved or valid network address information corresponding to destination network resources 103. In some embodiments, such a list may be unique to a particular authorization server 102, or a particular network device 101, such that each authorization server 102 or network device 101 may potentially have its own unique list of network address information maintained by security server 107.

If the network address information obtained in operation 403 matches the list, operation 405 may determine to proceed to operation 407. Alternatively, if the network address information from operation 403 does not match the list in operation 405 (or affirmatively matches a list of prohibited network address information, such as a blacklist), process 400 may proceed to a different operation. For example, in the event of a failed match in operation 405, process 400 may cycle back to operation 401 of identifying another application to analyze, or to operation 403 of identifying further target network address information used by the particular application being analyzed. In other embodiments, in the event of a failed match in operation 405 process 400 may proceed to operation 406 where a security control action may be performed. In various embodiments, the security control action may include blocking the application from utilizing the network address information, adding the network address information to a blacklist, disabling the application altogether, prompting the application for authentication (e.g., multi-factor or biometric authentication), generating an alert regarding the application, sending such an alert to security server 107, commencing a monitoring or auditing process for the application, or various other types of security control actions.

In some embodiments, operation 405 further considers whether the particular application being analyzed (or an identity associated with the application) has sufficient privileges to access the destination network resource 103. For example, even if the network address information corresponding to the destination network resources 103 is known, valid, and included on a whitelist, if may be the case that the application being analyzed (or an identity associated with the application) lacks sufficient privileges to access the destination network resource 103. For example, if the destination network resource 103 is a secure database accessible only to network administrators, an ordinary user of the application being analyzed may be unable to access it. In such an event, authorization server 102 should not redirect such a user (e.g., of network device 101) to that particular destination network resource 103. Similarly, the user itself should not be permitted to use the network address of the destination network resource 103 for such access. Further, operation 405 may further consider whether a user may be able to illegitimately elevate its privileges by accessing the destination network resource 103. For example, if the destination network resource 103 has strong privileged credentials (e.g., administrator credentials, root credentials, superuser credentials, etc.) stored thereon, operation 405 may determine that a user poses a threat of elevating its privileges to that high level if it is able to access the destination network resource 103.

If in operation 405 the network address information match is successful, process 400 proceeds to operation 407, including assessing, based on the comparing, whether the network security configuration is misconfigured. In this operation, if the network address information obtained in operation 403 is successfully verified, a confirmation may be generated confirming that the application is not misconfigured. Alternatively, if the network address information was not successfully verified in operation 405, a report may be generated confirming that the application is misconfigured.

In operation 408, process 400 may further determine, based on the assessment, whether to provide a configuration validation status for the application. For example, this configuration validation status may take several forms. One example may be a visual indication in a security platform (e.g., used by a security administrator) confirming the security configuration status of the application. Another example may be a report transmitted to a security platform. A further example may be an entry in a log or audit, indicating the security configuration status of the application.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers; firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data; or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order; depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for securely validating access tokens, the operations comprising:
   receiving, at a token validation resource, a token provided from a network application,
      the token having an associated destination network address;
   wherein:
      the token was dynamically created, and
      the token was provided to the network application;
   performing, at the token validation resource, a validation process for the token, the validation process being based on identifying a match between the destination network address and a list of trusted destination network addresses, the destination network address being at least one of: included in the token or included separate from the token in a message conveying the token; and determining, at the token validation resource and based on an outcome of the validation process, whether to permit the network application to transmit the token to a destination network resource associated with the destination network address for assertion to the destination network resource, wherein the determining comprises verifying, responsive to the outcome being successful, additional security data provided to a network device associated with the network application.

2. The non-transitory computer readable medium of claim 1,
wherein the network application was redirected to a network address associated with the token validation resource, and the network address associated with the token validation resource is included on the list of trusted destination network addresses.

3. The non-transitory computer readable medium of claim 1, wherein the validation process includes applying one or more network security policies.

4. The non-transitory computer readable medium of claim 1, wherein the validation process includes verifying at least one of: a certificate associated with the destination network resource, a range of permitted DNS addresses, or DNS history associated with the destination network resource.

5. The non-transitory computer readable medium of claim 1, wherein the validation process includes checking permissions associated with the network application.

6. A computer-implemented method for securely validating access tokens, the method comprising:
receiving, at a token validation resource, a token provided from a network application, the
token having an associated destination network address;
wherein:
the token was dynamically created, and
the token was provided to the network application;
performing, at the token validation resource, a validation process for the token, the validation
process being based on identifying a match between the destination network address and a list of trusted destination network addresses, the destination network address being at least one of: included in the token or included separate from the token in a message conveying the token; and
determining, at the token validation resource and based on an outcome of the validation process, whether to permit the network application to transmit the token to a destination network resource associated with the destination network address for assertion to the destination network resource, wherein the determining comprises verifying, responsive to the outcome being successful, additional security data provided to a network device associated with the network application.

7. The computer-implemented method of claim 6, wherein an authorization server dynamically created the token in response to the network application sending a request for access to the destination network resource.

8. The computer-implemented method of claim 7, wherein the destination network resource redirected the network application to the authorization server based on the request.

9. The computer-implemented method of claim 6, wherein an authorization server authenticated an identity associated with the network application before dynamically creating the token.

10. The computer-implemented method of claim 9, wherein the authorization server and the destination network resource operate according to an OAuth authorization protocol.

11. The computer-implemented method of claim 6, further comprising generating a report if the validation process for the token results in the token not being validated.

12. The computer-implemented method of claim 6, further comprising generating an alert if the validation process for the token results in the token not being validated.

13. A non-transitory computer readable medium including instructions that, when executed by at least one processor, cause the at least one processor to perform operations for securely validating access tokens, the operations comprising:
receiving, at a proxy resource, a request from a network application for a token;
receiving, at the proxy resource, the token having an associated destination network address, wherein the token was dynamically created and provided to the network application;
performing, at the proxy resource, a validation process for the token, the validation process being based on identifying a match between the destination network address and a list of trusted destination network addresses, the destination network address being at least one of: included in the token or included separate from the token in a message conveying the token; and
determining, at the proxy resource and based on an outcome of the validation process, whether to permit the network application to transmit the token to a destination network resource associated with the destination network address for assertion to the destination network resource, wherein the determining comprises verifying, responsive to the outcome being successful, additional security data provided to a network device associated with the network application.

14. The non-transitory computer readable medium of claim 13, wherein the proxy resource received the token from an authorization server.

15. The computer-implemented method of claim 13, wherein the proxy resource created the token.

16. The computer-implemented method of claim 13, wherein the proxy resource intercepts the request from the network application for an authorization server to provide the token.

17. The computer-implemented method of claim 13, wherein the proxy resource is a software agent running on a machine that runs the network application.

18. The computer-implemented method of claim 13, wherein the proxy resource is a proxy server separate from a machine that runs the network application.

19. The computer-implemented method of claim 13, wherein the operations further comprise auditing access by the network application to the destination network resource.

20. The computer-implemented method of claim 13, wherein the operations further comprise auditing access by a plurality of network applications to a plurality of destination network resources.

* * * * *